(12) United States Patent
Marupaduga

(10) Patent No.: US 11,765,630 B2
(45) Date of Patent: *Sep. 19, 2023

(54) DYNAMIC ANTENNA 5G NR SYNCHRONIZATION SIGNAL BLOCK BEAM DEACTIVATION

(71) Applicant: T-MOBILE INNOVATIONS LLC, Overland Park, KS (US)

(72) Inventor: Sreekar Marupaduga, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/828,241

(22) Filed: May 31, 2022

(65) Prior Publication Data

US 2022/0295362 A1    Sep. 15, 2022

Related U.S. Application Data

(63) Continuation of application No. 16/951,527, filed on Nov. 18, 2020, now Pat. No. 11,368,886.

(51) Int. Cl.
*H04W 36/00* (2009.01)
*H04W 72/044* (2023.01)
*H04W 56/00* (2009.01)
*H04W 72/541* (2023.01)

(52) U.S. Cl.
CPC . *H04W 36/0072* (2013.01); *H04W 36/00837* (2018.08); *H04W 56/001* (2013.01); *H04W 72/044* (2013.01); *H04W 72/541* (2023.01)

(58) Field of Classification Search
None
See application file for complete search history.

(56) References Cited

U.S. PATENT DOCUMENTS

| 10,966,168 | B1* | 3/2021 | Krishnamoorthy ... H04W 68/00 |
| 2009/0129273 | A1 | 5/2009 | Zou |
| 2014/0078961 | A1 | 3/2014 | Shen et al. |
| 2016/0330703 | A1 | 11/2016 | Shim et al. |
| 2017/0006563 | A1 | 1/2017 | Lindoff et al. |
| 2018/0310283 | A1 | 10/2018 | Deenoo et al. |
| 2020/0177266 | A1 | 6/2020 | Kang et al. |
| 2020/0267712 | A1 | 8/2020 | Cirik et al. |
| 2020/0358585 | A1 | 11/2020 | Ryu et al. |
| 2021/0243703 | A1 | 8/2021 | Wolf et al. |

OTHER PUBLICATIONS

Roessler, A., "Demystifying 5G-Concept of SSB beamforming in mmWave frequencies | Rohde & Schwarz", Retrieved from Internet URL : https://www.rohde-schwarz.com/us/knowledge-center/videos/demystifying-5g-concept-of-ssb-beamforming-in-mmwave-frequencies-video-detailpage_251220-655828.html, accessed on Jul. 7, 2020, pp. 4 (Jul. 3, 2019).

* cited by examiner

*Primary Examiner* — Suhail Khan
(74) *Attorney, Agent, or Firm* — SHOOK, HARDY & BACON L.L.P.

(57) ABSTRACT

Methods are provided for dynamically deactivating synchronization signal block (SSB) beams based on uplink noise. Uplink noise is monitored at a cell site over a configurable period of time. Upon the uplink noise being determined to be above a threshold value, SSB beams corresponding to user equipment that are contributing to the uplink noise are determined. Based on a magnitude of the uplink noise at the cell site, one or more SSB beams of the SSB beams are dynamically deactivated at the cell site.

20 Claims, 4 Drawing Sheets

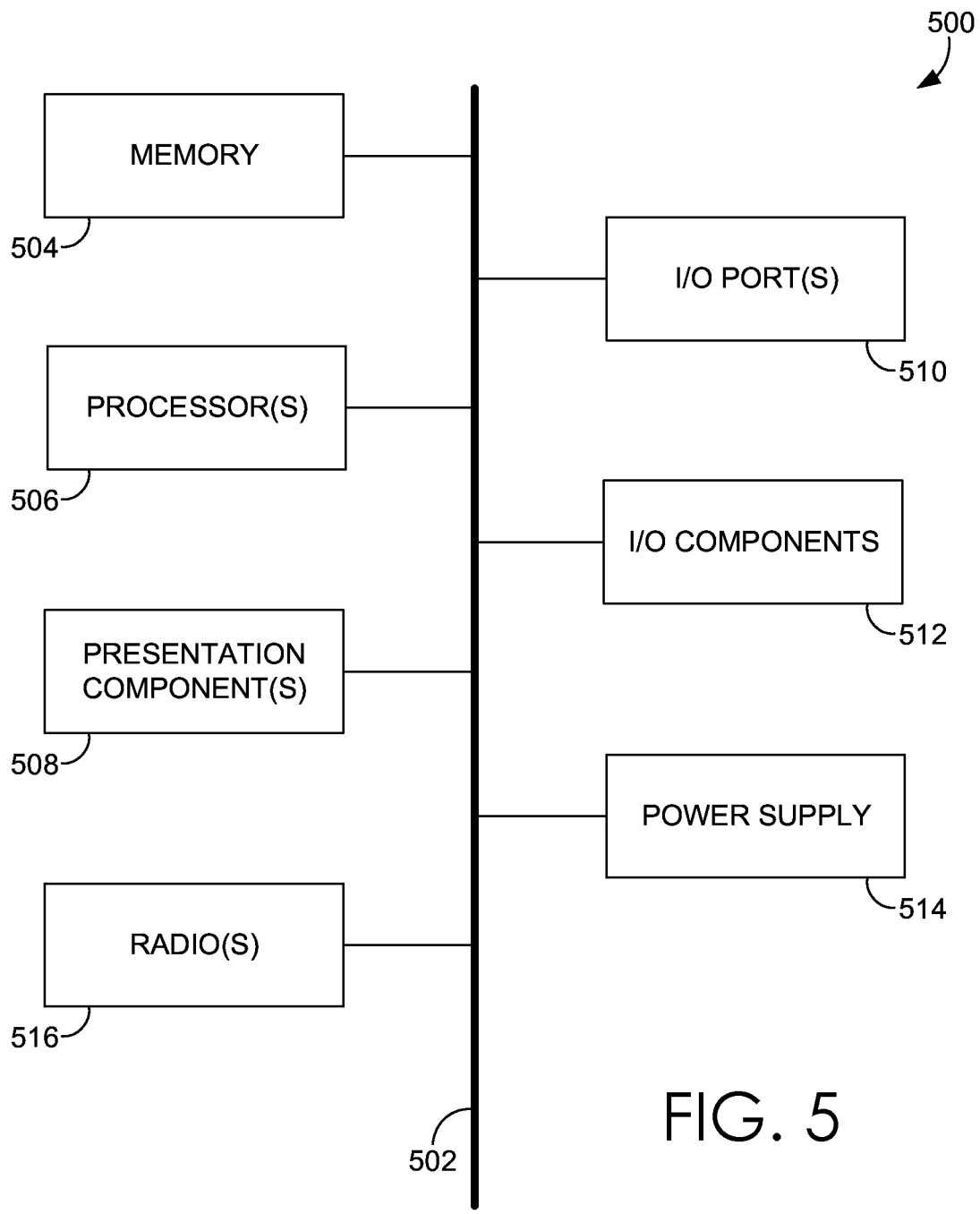

DYNAMIC ANTENNA 5G NR SYNCHRONIZATION SIGNAL BLOCK BEAM DEACTIVATION

CROSS-REFERENCE SECTION

This application is a continuation of prior application Ser. No. 16/951,527 (filed Nov. 18, 2020), which is incorporated herein by reference in its entirety.

SUMMARY

A high-level overview of various aspects of the invention are provided here for that reason, to provide an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter.

In brief and at a high level, aspects are provided for dynamically deactivating synchronization signal block (SSB) beams. To do so, uplink noise is monitored at a cell site or a component thereof (e.g., eNodeB, gNodeB) over a configurable period of time. Upon the uplink noise being determined to be above a threshold value, SSB beams corresponding to user equipment that are contributing to the uplink noise are determined. For example, SSB indices of a particular UE contributing to the uplink noise may be identified to determine the SSB beams. In another example, a latitude and longitude of a particular UE contributing to the uplink noise may be identified to determine the SSB beams.

Based on a magnitude of the uplink noise at the cell site, one or more SSB beams of the SSB beams are dynamically deactivated at the cell site. In various aspects, the particular UE is handed over from an SSB beam of the one or more SSB beams to a neighboring SSB beam at the cell site, to 4G LTE at a same location as the SSB beam, or to a different cell site.

BRIEF DESCRIPTION OF THE SEVERAL VIEWS OF THE DRAWINGS

Illustrative embodiments of the present invention are described in detail below with reference to the attached drawing figures, and wherein:

FIG. 5 depicts an exemplary computing device suitable for use in implementations of aspects herein.

DETAILED DESCRIPTION

Figure 1:
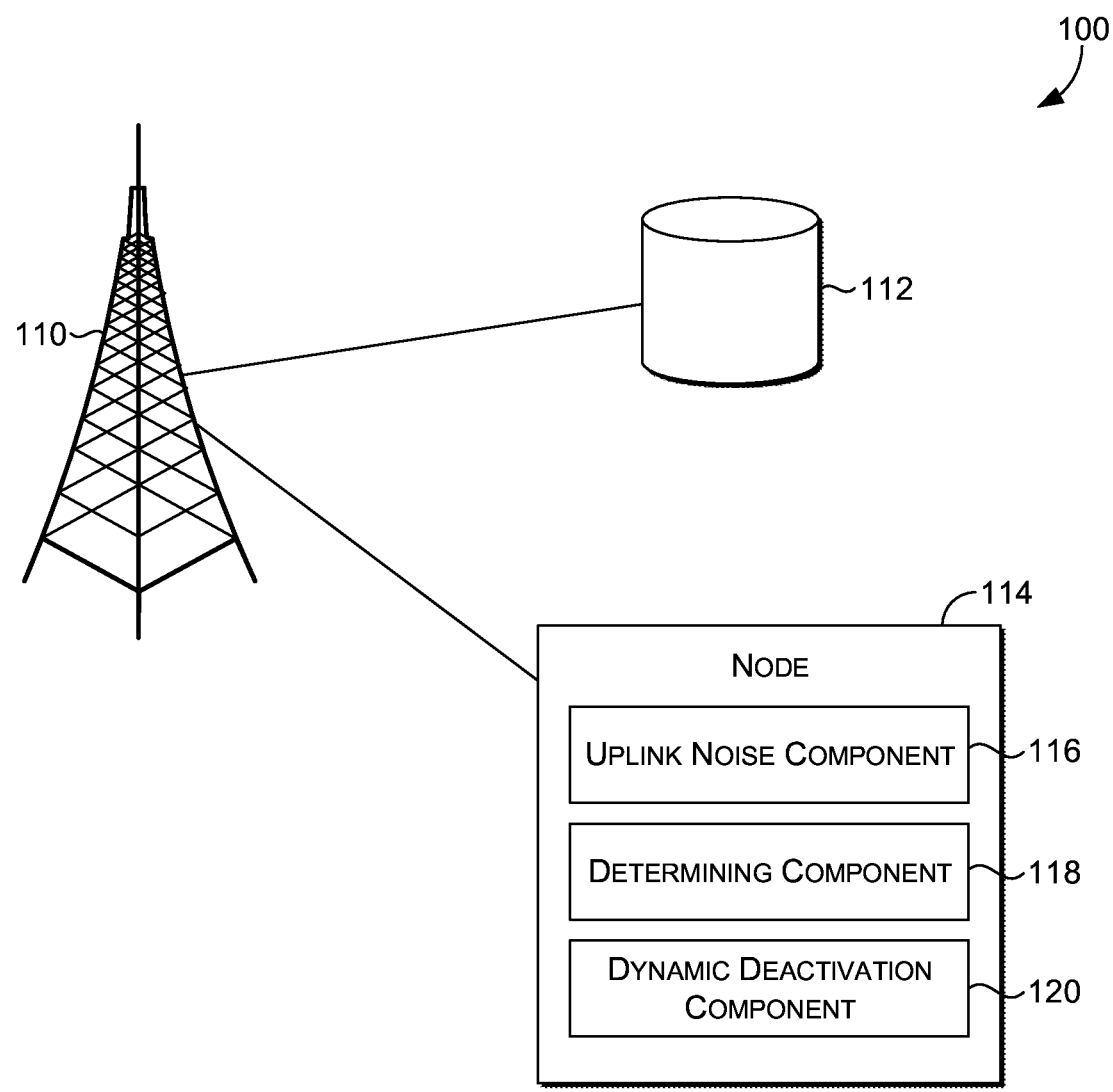
FIG. 1 depicts an example of a network environment in accordance with one or more embodiments.

The subject matter of select embodiments of aspects herein is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of aspects herein.

Embodiments herein may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. Computer-readable media includes media implemented in any way for storing information. Examples of stored information include computer-useable instructions, data structures, program modules, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer-program product that includes computer-useable or computer-executable instructions embodied on one or more computer-readable media.

"Computer-readable media" can be any available media and may include volatile and nonvolatile media, as well as removable and non-removable media. By way of example, and not limitation, computer-readable media may include computer storage media and communication media.

"Computer storage media" may include, without limitation, volatile and nonvolatile media, as well as removable and non-removable media, implemented in any method or technology for storage of information, such as computer-readable instructions, data structures, program modules, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage devices, or any other medium which can be used to store the desired information and which may be accessed by the computing device 500 shown in FIG. 5. Computer storage media does not comprise a signal per se.

"Communication media" may include, without limitation, computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

A "network" refers to a network comprised of wireless and wired components that provide wireless communications service coverage to one or more UE. The network may comprise one or more base stations, one or more cell sites (i.e., managed by a base station), one or more cell towers (i.e., having an antenna) associated with each base station or cell site, a gateway, a backhaul server that connects two or more base stations, a database, a power supply, sensors, and other components not discussed herein, in various embodiments.

The terms "base station" and "cell site" may be used interchangeably herein to refer to a defined wireless communications coverage area (i.e., a geographic area) serviced by a base station. It will be understood that one base station may control one cell site or alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

An "access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO) as discussed hereinafter.

The terms "user equipment," "UE," and "user device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In embodiments, UE may take on any variety of devices, such as a personal computer, a laptop computer, a tablet, a netbook, a mobile phone, a smart phone, a personal digital assistant, a wearable device, a fitness tracker, or any other device capable of communicating using one or more resources of the network. UE may include components such as software and hardware, a processor, a memory, a display component, a power supply or power source, a speaker, a touch-input component, a keyboard, and the like. In embodiments, some of the UE discussed herein may include current UE capable of using 5G and having backward compatibility with prior access technologies, current UE capable of using 5G and lacking backward compatibility with prior access technologies, and legacy UE that is not capable of using 5G.

The terms "radio," "controller," "antenna," and "antenna array" are used interchangeably to refer to one or more software and hardware components that facilitate sending and receiving wireless radio-frequency signals, for example, based on instructions from a base station. A radio may be used to initiate and generate information that is then sent out through the antenna array, for example, where the radio and antenna array may be connected by one or more physical paths. Generally an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical, spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

Additionally, it will be understood that terms such as "first," "second," and "third" are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such.

Synchronization signal blocks (SSBs), also referred to as synchronization signals, are a transmission sent by an antenna element, antenna array, or antenna at a cell site. In some aspects, the SSB may be an NR-5G specific SSB. SSBs typically consist of three components, including a primary synchronization signal, secondary synchronization signal, and a broadcast channel. SSBs are used for synchronization, cell searching, and initial beamforming. Typically, SSBs are sent in repetition, such as in bursts. In conventional systems, during Massive MIMO deployment, a network operator selects a default or static number of SSB beams used at a particular cell site. In these systems, this generic SSB beam configuration is often implemented across the market or network contributing to a less than optimal network coverage.

SSB beams, as used herein, refer to the beams that are formed by the antennas in the antenna array of a cell site. For example, in a 128 antenna array, some or all of these antennas are used to form the SSB beams. An SSB beam configuration refers to the quantity of beams formed by the antennas of the antenna array. In some aspects, the quantity of beams could be one, two, four, six, and larger.

Instead of the typically static SSB beam configuration utilized at a cell site, aspects herein provide for dynamically deactivating one or more SSB beams at a cell site based on uplink noise. For example, when too many UEs are on a particular SSB beam (which is often the case in a dense area like New York or Chicago, for example), uplink noise is created at the base station. The uplink noise impacts the performance of the entire cell site, not just particular UEs or on the particular SSB beam.

In practice, assume a cell site has thirty two SSB beams. Some UEs may be transmitting at a very high power on uplink over a period of time (e.g., ninety seconds). Since these UEs are transmitting at high power, the cell site is unable to decode packets from a low power UE. Consequently, packet drops begin to occur and UEs go into retransmission mode. To overcome these issues aspects are provided for dynamically deactivating synchronization signal block (SSB) beams.

To do so, uplink noise is monitored at a cell site or a component thereof (e.g., eNodeB, gNodeB) over a configurable period of time. Upon the uplink noise being determined to be above a threshold value, SSB beams corresponding to user equipment that are contributing to the uplink noise are determined. For example, SSB indices of a particular UE contributing to the uplink noise may be identified to determine the SSB beams. In another example, a latitude and longitude of a particular UE contributing to the uplink noise may be identified to determine the SSB beams.

Based on a magnitude of the uplink noise at the cell site, one or more SSB beams of the SSB beams are dynamically deactivated at the cell site. In various aspects, the particular UE is handed over from an SSB beam of the one or more SSB beams to a neighboring SSB beam at the cell site, to 4G LTE at a same location as the SSB beam, or to a different cell site.

In one aspect, a method is provided for dynamically deactivating SSB beams based on uplink noise is provided. The method comprises monitoring uplink noise at a cell site over a configurable period of time. The method also comprises determining the uplink noise is above a threshold value. The method further comprises determining SSB beams corresponding to UEs that are contributing to the uplink noise. The method also comprises, based on a magnitude of the uplink noise at the cell site, dynamically deactivating one or more SSB beams of the SSB beams at the cell site.

In another aspect, computer-readable storage media having computer-executable instructions embodied thereon is provided that, when executed by one or more processors, cause the processors to perform a method. The method includes monitoring uplink noise at a cell site over a configurable period of time. The method also comprises determining the uplink noise is above a threshold value. The method further comprises determining SSB beams corresponding to UEs that are contributing to the uplink noise. The method also comprises, based on a magnitude of the uplink noise at the cell site, dynamically deactivate one or more SSB beams of the SSB beams at the cell site.

In yet another aspect, a system for deactivating SSB beams based on uplink noise is provided. The system comprises one or more UEs and a cell site comprising a plurality of antennas forming a plurality of SSB beams. The cell site monitors uplink noise at the cell site. The cell site also determines the uplink noise at the cell site is above a threshold value. The cell site further determines a SSB beam of the plurality of SSB beams corresponding to UEs of the one of more UEs that are contributing to the uplink noise. Based on a magnitude of the uplink noise at the cell site, the cell site also dynamically deactivates one or more SSB beams of the plurality of SSB beams at the cell site.

Beginning with FIG. 1, an example of a network environment 100 suitable for use in implementing embodiments of the present disclosure is provided. The network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

The network environment 100 includes a network (not shown) that provides service to UEs. The network may be accessible through cell site 110, which includes several components, including a base station. The base station and/or a computing device (e.g., whether local or remote) associated with the base station may manage or otherwise control the operations of components of a cell site, including an antenna array located within cell site 110. The base station and/or the computing device associated with the base station may include one or more processors and computer-readable storage media having computer-executable instructions or computer instruction modules embodied thereon for execution by one or more processors.

The antenna array associated with cell site 110 may radiate in a particular direction and thus may correspond to a particular sector of a cell site. The antenna array may have a plurality of antenna elements, in embodiments. In one embodiment, the antenna array is configured to have a plurality of elements that in number, arrangement, and/or density, are configured for mMIMO. In one such embodiment, the base station may include a radio and/or a controller, such as a Massive Multiple-Input Multiple-Output Unit (MMU) for controlling a mMIMO configured antenna array. The base station may use the controller to monitor one or more network operation parameters, including throughput, signal quality metrics (e.g., SINR), a quantity of unique users/subscribers, etc.

As shown in FIG. 1, cell site 110 communicates at least with a database 112 and a node 114, which could be an Evolved Node B (i.e., "eNodeB" or "eNB") or a Next Generation Node B (i.e., "gNodeB" or "gNB"). Node 114 includes an uplink noise component 116, a determining component 118, and a dynamic deactivation component 120. Initially, node 114 or another network component not shown herein (e.g., element management system) is generally responsible for monitoring network performance conditions, accessing database 112 for potential SSB beam configurations that can be used, and for selecting an optimal SSB beam configuration (e.g., a number of SSB beams).

Uplink noise component 116 monitors uplink noise at a cell site over a configurable period of time. For example, uplink noise component 116 may monitor uplink noise at a cell site for ninety second intervals. The monitored uplink noise may be stored at database 112. If uplink noise component 116 determines the uplink noise is above a threshold value, determining component 118 determines which SSB beams have UEs contributing to the uplink noise.

In embodiments, determining component 118 identifies SSB indices for a particular UE of the UEs contributing to the uplink noise. Different SSB indices are used to cover different parts of the cell area for the cell site. Determining component 118 may include a network scanner with channel decoding capabilities. A physical broadcast channel (PBCH) is transmitted within three orthogonal frequency-division multiplexing (OFDM) symbols. Each of the OFDM symbols also includes demodulation reference symbols (DRMS). The network scanner is able to decode the master information block (MIB) which includes three PBCH bits and three bits derived from PBCH DRMS. These six bits in total enable the determining component 118 to identify up to sixty-four SSB indices independently.

Additionally or alternatively, determining component 118 identifies SSB indices for a particular UE of the UEs contributing to the uplink based on a latitude and longitude of a particular UE of the UEs. For example, determining component 118 may query database 112 to obtain the latitude and longitude of a particular UE contributing to the uplink noise.

Based on a magnitude of the uplink noise at the cell site, dynamic deactivation component 120 dynamically deactivates one or more SSB beams of the SSB beams at the cell site. The number of SSB beams deactivated may be dependent on the magnitude of the uplink noise. For example, if the uplink noise exceeds −110 dBM, one SSB beam may be deactivated. However, if the uplink noise exceeds −80 dBM, multiple SSB beams may be deactivated.

Having described the network environment 100 and components operating therein, it will be understood by those of ordinary skill in the art that the network environment 100 is but one example of a suitable network and is not intended to limit the scope of use or functionality of aspects described herein. Similarly, the network environment 100 should not be interpreted as imputing any dependency and/or any requirements with regard to each component and combination(s) of components illustrated in FIG. 1. It will be appreciated by those of ordinary skill in the art that the number, interactions, and physical location of components illustrated in FIG. 1 are examples, as other methods, hardware, software, components, and devices for establishing one or more communication links between the various components may be utilized in implementations of the present invention. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though components may be represented as singular components or may be represented in a particular quantity in FIG. 1, it will be appreciated that some aspects may include a plurality of devices and/or components such that FIG. 1 should not be considered as limiting the quantity of any device and/or component.

Figure 2:
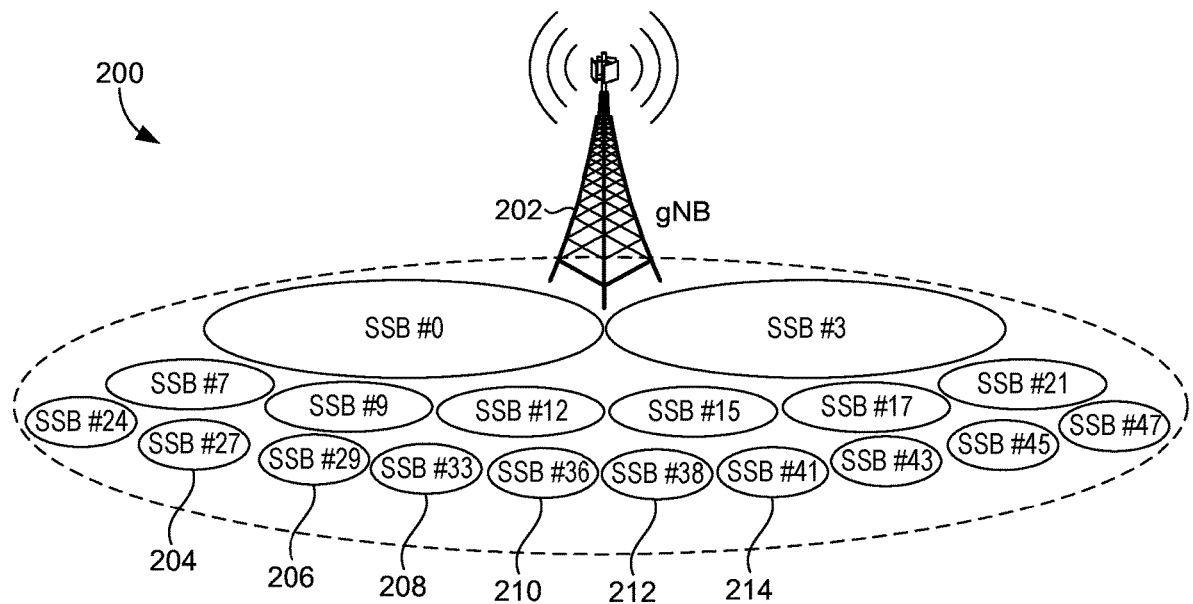
FIG. 2 depicts a diagram of an example operating environment illustrating dynamic SSB beam deactivation, in accordance with aspects herein.
Figure 3:
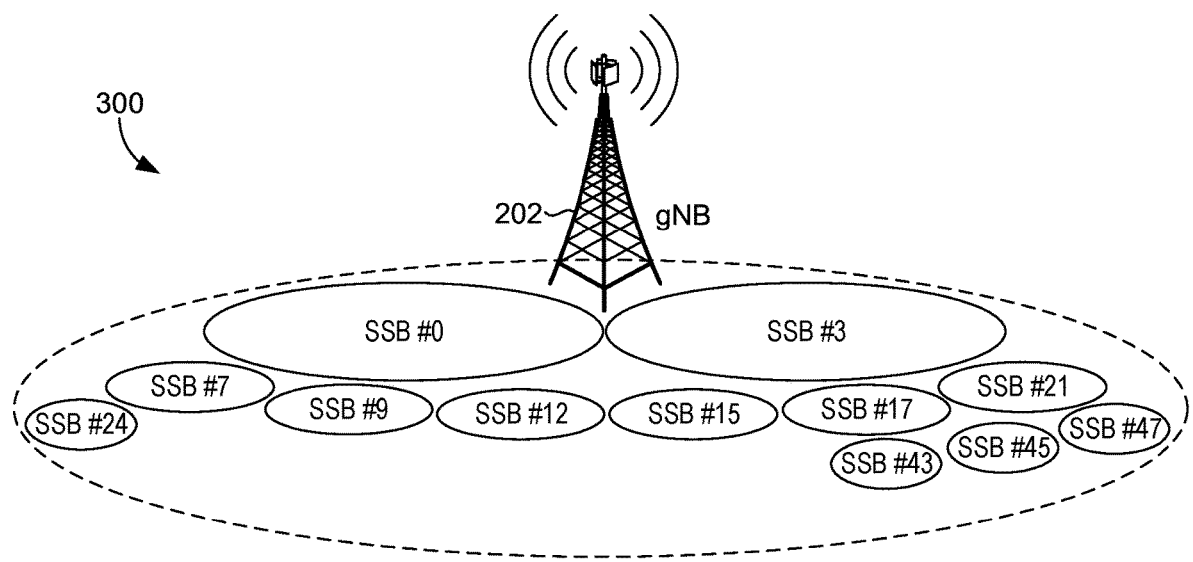
FIG. 3 depicts a diagram of an example operating environment illustrating dynamic SSB beam deactivation, in accordance with aspects herein.

In FIGS. 2 and 3, diagrams of example operating environments 200, 300 illustrating dynamic SSB beam deactivation are depicted. Initially, in operating environment 200, cell site 202 includes a plurality of SSB beams. As described herein, cell site 202 monitors uplink noise over a configurable period of time. Once it is determined that the uplink noise is above a threshold value, SSB beams corresponding to UEs that are contributing to the uplink noise are determined. In this operating environment 200, cell site 202 has determined that UEs in SSB 204, SSB 206, SSB 208, SSB 210, SSB 212, and SSB 214 are contributing to the uplink noise.

Accordingly, and referring now to FIG. 3, cell site 202 dynamically deactivates SSB 204, SSB 206, SSB 208, SSB 210, SSB 212, and SSB 214 are contributing to the uplink noise. Any UEs that were provided service by SSB 204, SSB 206, SSB 208, SSB 210, SSB 212, and SSB 214 are handed over to an SSB that is still active (i.e., a neighboring SSB beam), to 4G LTE at the same location, or to a different cell site.

Figure 4:
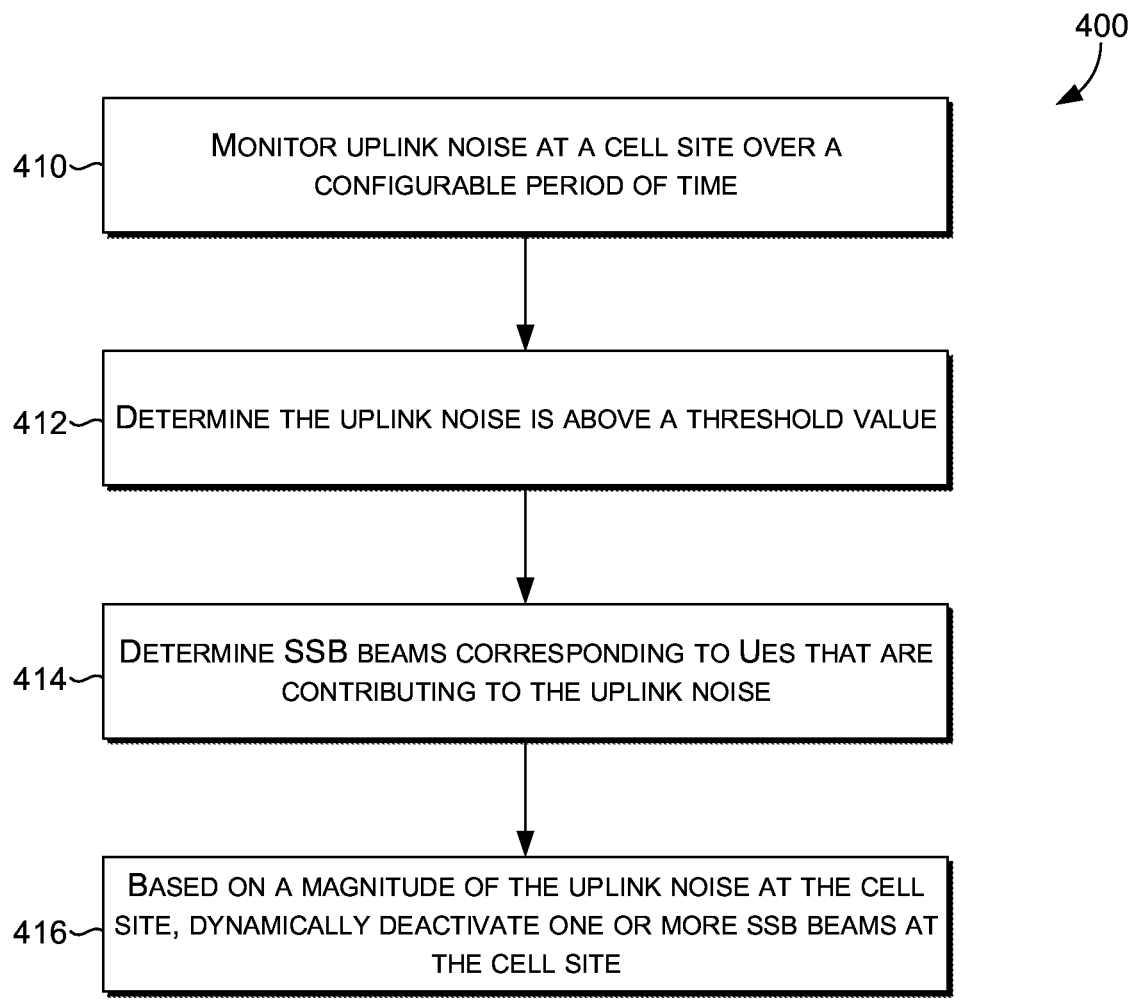
FIG. 4 depicts a flowchart of an exemplary method for dynamically SSB beam deactivation, in accordance with aspects herein.

FIG. 4 depicts a flowchart of an exemplary method 400 for dynamically modifying an SSB beam configuration, in accordance with aspects herein. At block 410, uplink noise is monitored at a cell site over a configurable period of time. The monitored uplink noise may be stored in a database at the cell site. The uplink noise is determined, at block 412, to be above a threshold value.

At block 414, SSB beams corresponding to user equipment (UEs) that are contributing to the uplink noise are determined. In some embodiments, the SSBs beams corresponding to UEs that are contributing to the uplink noise are determined based on identifying SSB indices of a particular UE of the UEs. In some embodiments, the SSBs beams corresponding to UEs that are contributing to the uplink noise are determined based on identifying a latitude and longitude of a particular UE of the UEs.

Based on a magnitude of the uplink noise at the cell site, at block 416, one or more SSB beams of the SSB beams are dynamically deactivated the cell site. In some embodiments, if the magnitude of the uplink noise is determined to exceed a threshold, additional SSB beams are dynamically deactivated at the cell site.

In some embodiments, a particular UE of the UEs is handed over from an SSB beam of the one or more SSB beams to a neighboring SSB beam at the cell site. In some embodiments, a particular UE of the UEs is handed over from an SSB beam of the one or more SSB beams to 4G LTE at a same location as the SSB beam. In some embodiments, a particular UE of the UEs is handed over from an SSB beam of the one or more SSB beams to a different cell site.

Referring to FIG. 5, a block diagram of an example of a computing device 500 suitable for use in implementations of the technology described herein is provided. In particular, the exemplary computer environment is shown and designated generally as computing device 500. Computing device 500 is but one example of a suitable computing environment and is not intended to suggest any limitation as to the scope of use or functionality of the invention. Neither should computing device 500 be interpreted as having any dependency or requirement relating to any one or combination of components illustrated. In aspects, the computing device 500 may be a base station. In another embodiment, the computing device 500 may be UE capable of two-way wireless communications with an access point. Some non-limiting examples of the computing device 500 include a base station, a controller at a base station, a backhaul server, a personal computer, a cell phone, current UE, legacy UE, a tablet, a pager, a personal electronic device, a wearable electronic device, an activity tracker, a laptop, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 5, computing device 500 includes a bus 502 that directly or indirectly couples various components together. The bus 502 may directly or indirectly one or more of memory 504, processor(s) 506, presentation component(s) 508 (if applicable), radio(s) 510, input/output (I/O) port(s) 512, input/output (I/O) component(s) 514, power supply 516, and/or transmitter(s) 518. Although the components of FIG. 5 are shown with lines for the sake of clarity, in reality, delineating various components is not so clear, and metaphorically, the lines would more accurately be grey and fuzzy. For example, one may consider a presentation component(s) 508 such as a display device to be one of I/O components 514. Also, the processor(s) 506 may include memory 504, in another example. The present disclosure hereof recognizes that such is the nature of the art, and reiterates that FIG. 5 is merely illustrative of an example of a computing device 500 that can be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 504 may take the form of memory components described herein. Thus, further elaboration will not be provided here, but it should be noted that memory 504 may include any type of tangible medium that is capable of storing information, such as a database or data store. A database or data store may be any collection of records, files, or information encoded as electronic data and stored in memory 504, for example. In one embodiment, memory 504 may include a set of embodied computer-readable and executable instructions that, when executed, facilitate various functions or elements disclosed herein. These embodied instructions will variously be referred to as "instructions" or an "application" for short.

Processor(s) 506 may be multiple processors that receive instructions and process them accordingly. Presentation component(s) 508, if available, may include a display device, an audio device such as a speaker, and/or other components that may present information through visual (e.g., a display, a screen, a lamp (LED), a graphical user interface (GUI), and/or even lighted keyboards), auditory, and/or other tactile or sensory cues.

Radio(s) 510 represents one or more radios that facilitate communication with a wireless telecommunications network. For example, radio(s) 510 may be connected to one or more antenna elements through a physical path. Illustrative wireless telecommunications technologies include CDMA, GPRS, TDMA, GSM, and the like. Radio(s) 510 might additionally or alternatively facilitate other types of wireless communications including Wi-Fi, WiMAX, 4G, 3G, 4G, LTE, mMIMO, 5G, NR, VoLTE, and/or other VoIP communications. As can be appreciated, in various embodiments, radio(s) 510 can be configured to concurrently support multiple technologies, as previously discussed herein. As such, each of many radio(s) 510 may be used to separately control portions of an antenna array, for example, where at least one portion utilizes a distinct technology relative to another portion in the same antenna array or at the same base station or cell site. A wireless telecommunications network might include an array of devices, which are not shown so as to not obscure more relevant aspects of the invention. Components such as a base station, a communications tower, or even access points (as well as other components) can provide wireless connectivity in some embodiments.

The input/output (I/O) ports 512 may take a variety of forms. Exemplary I/O ports 512 may include a USB jack, a stereo jack, an infrared port, a firewire port, other proprietary communications ports, and the like. Input/output (I/O) components 514 may comprise keyboards, microphones, speakers, touchscreens, and/or any other item usable to directly or indirectly input data into the computing device 500.

Power supply 516 may include batteries, fuel cells, and/or any other component that may act as a power source to supply power to the computing device 500 or to other network components, including through one or more electrical connections or couplings. Power supply 516 may be configured to selectively supply power to different components independently and/or concurrently.

Finally, regarding FIGS. 1 through 5, it will be understood by those of ordinary skill in the art that the environment(s), system(s), and/or methods(s) depicted are not intended to limit the scope of use or functionality of the present embodiments. Similarly, the environment(s), system(s), and/or methods(s) should not be interpreted as imputing any dependency and/or any requirements with regard to each component, each step, and combination(s) of components or step(s) illustrated therein. It will be appreciated by those having ordinary skill in the art that the connections illustrated the figures are contemplated to potentially include methods, hardware, software, and/or other devices for establishing a communications link between the components, devices, systems, and/or entities, as may be utilized in implementation of the present embodiments. As such, the absence of component(s) and/or steps(s) from the figures should be not be interpreted as limiting the present embodiments to exclude additional component(s) and/or combination(s) of components. Moreover, though devices and components in the figures may be represented as singular devices and/or components, it will be appreciated that some embodiments can include a plurality of devices and/or components such that the figures should not be considered as limiting the number of devices and/or components.

It is noted that aspects of the present invention are described herein with reference to block diagrams and flowchart illustrations. However, it should be understood that each block of the block diagrams and/or flowchart illustrations can be implemented in the form of a computer program product, an entirely hardware embodiment, a combination of hardware and computer program products, and/ or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code can be performed sequentially such that one instruction is retrieved, loaded, and executed at a time. In some embodiments, retrieval, loading, and/or execution can be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Additionally, as should be appreciated, various embodiments of the present disclosure described herein can also be implemented as methods, apparatus, systems, computing devices/entities, computing entities, and/or the like. As such, embodiments of the present disclosure can take the form of an apparatus, system, computing device, computing entity, and/or the like executing instructions stored on a computer-readable storage medium to perform certain steps or operations. However, embodiments of the present disclosure can also take the form of an entirely hardware embodiment performing certain steps or operations.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for dynamically deactivating synchronization signal block (SSB) beams based on uplink noise, the method comprising:
   determining SSB beams corresponding to user equipment (UEs) that are contributing to uplink noise at a cell site; and
   based on a magnitude of the uplink noise at the cell site, dynamically deactivating one or more SSB beams of the SSB beams at the cell site.

2. The method of claim 1, further comprising monitoring the uplink noise at the cell site over a configurable period of time.

3. The method of claim 2, further comprising determining the uplink noise is above a threshold value.

4. The method of claim 3, further comprising determining the SSB beams corresponding to user equipment that is contributing to the uplink noise by identifying SSB indices of a particular UE of the UEs that is contributing to the uplink noise at the cell site.

5. The method of claim 4, further comprising determining the SSB beams corresponding to user equipment that is contributing to the uplink noise by identifying a latitude and longitude of the particular UE of the UEs.

6. The method of claim 5, further comprising handing over the particular UE of the UEs from an SSB beam of the one or more SSB beams to a neighboring SSB beam at the cell site.

7. The method of claim 5, further comprising handing over a particular UE of the UEs from an SSB beam of the one or more SSB beams to 4G LTE at a same location as the SSB beam.

8. The method of claim 5, further comprising handing over a particular UE of the UEs from an SSB beam of the one or more SSB beams to a different cell site.

9. Computer storage media having computer-executable instructions embodied thereon that, when executed by one or more processors, cause the processors to:
determine synchronization signal block (SSB) beams corresponding to user equipment (UEs) that are contributing to uplink noise at a cell site; and
based on a magnitude of the uplink noise at the cell site, dynamically deactivate one or more SSB beams of the SSB beams at the cell site.

10. The media of claim 9, further comprising:
monitoring the uplink noise at the cell site over a configurable period of time; and
determining the uplink noise is above a threshold value.

11. The media of claim 10, further comprising determining the SSB beams corresponding to user equipment that is contributing to the uplink noise by identifying SSB indices of a particular UE of the UEs that is contributing to the uplink noise at the cell site.

12. The media of claim 11, further comprising determining the SSB beams corresponding to user equipment that is contributing to the uplink noise by identifying a latitude and longitude of the particular UE of the UEs.

13. The media of claim 12, further comprising handing over the particular UE of the UEs from an SSB beam of the one or more SSB beams to a neighboring SSB beam at the cell site.

14. The media of claim 12, further comprising handing over a particular UE of the UEs from an SSB beam of the one or more SSB beams to 4G LTE at a same location as the SSB beam.

15. The media of claim 12, further comprising handing over a particular UE of the UEs from an SSB beam of the one or more SSB beams to a different cell site.

16. A system for deactivating synchronization signal block (SSB) beams based on uplink noise, the system comprising:
one or more user equipment (UEs); and
a cell site comprising a plurality of antennas forming a plurality of SSB beams, the cell site:
determining SSB beams corresponding to user equipment (UEs) that are contributing to uplink noise at a cell site; and
based on a magnitude of the uplink noise at the cell site, dynamically deactivating one or more SSB beams of the SSB beams at the cell site.

17. The system of claim 16, further comprising monitoring the uplink noise at the cell site over a configurable period of time.

18. The system of claim 17, further comprising determining the uplink noise is above a threshold value.

19. The system of claim 18, further comprising determining the SSB beams corresponding to user equipment that is contributing to the uplink noise by:
identifying SSB indices of a particular UE of the UEs that is contributing to the uplink noise at the cell site; and
identifying a latitude and longitude of the particular UE of the UEs.

20. The system of claim 19, further comprising:
handing over the particular UE of the UEs from an SSB beam of the one or more SSB beams to a neighboring SSB beam at the cell site;
handing over a particular UE of the UEs from an SSB beam of the one or more SSB beams to 4G LTE at a same location as the SSB beam; or
handing over a particular UE of the UEs from an SSB beam of the one or more SSB beams to a different cell site.

* * * * *